United States Patent
Lv et al.

(10) Patent No.: US 10,203,444 B2
(45) Date of Patent: Feb. 12, 2019

(54) DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Jinku Lv, Beijing (CN); Xue Dong, Beijing (CN); Ming Chen, Beijing (CN); Zhanchang Bu, Beijing (CN); Bochang Wang, Beijing (CN); Yutao Hao, Beijing (CN); Ying Chen, Beijing (CN); Junjie Guo, Beijing (CN); Xiang Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/567,231

(22) PCT Filed: May 5, 2017

(86) PCT No.: PCT/CN2017/083200
§ 371 (c)(1),
(2) Date: Oct. 17, 2017

(87) PCT Pub. No.: WO2018/040609
PCT Pub. Date: Mar. 8, 2018

(65) Prior Publication Data
US 2018/0292595 A1    Oct. 11, 2018

(30) Foreign Application Priority Data
Aug. 29, 2016 (CN) .......................... 2016 1 0751496

(51) Int. Cl.
  *F21V 8/00* (2006.01)
  *G02B 6/00* (2006.01)
(52) U.S. Cl.
  CPC ............. *G02B 6/0043* (2013.01); *G02B 6/00* (2013.01); *G02B 6/005* (2013.01); *G02B 6/0065* (2013.01); *G02B 6/0068* (2013.01)
(58) Field of Classification Search
  CPC .... G02B 6/0043; G02B 6/005; G02B 6/0065; G02B 6/0068
  See application file for complete search history.

(56) References Cited

U.S. PATENT DOCUMENTS

2002/0180711 A1* 12/2002 Umemoto ............ G02B 6/0036
                                                              345/173
2002/0180910 A1* 12/2002 Umemoto ............ G02B 6/0036
                                                              349/113
(Continued)

FOREIGN PATENT DOCUMENTS

CN       202217253 U     5/2012
CN       204883741 U    12/2015
(Continued)

OTHER PUBLICATIONS

International Search Report & Written Opinion dated Jul. 27, 2017, regarding PCT/CN2017/083200.

*Primary Examiner* — Mary Ellen Bowman
(74) *Attorney, Agent, or Firm* — Intellectual Valley Law, P.C.

(57) ABSTRACT

A display apparatus includes: a display panel having a display surface; a light-guiding plate over the display surface, the light-guiding plate including a bottom surface facing the display surface; a light source on a side surface of the light-guiding plate; and a low-refractive-index medium layer between the bottom surface and the display surface, a (Continued)

refractive index of the low-refractive-index medium layer being lower than a refractive index of the light-guiding plate by at least about 0.15.

9 Claims, 3 Drawing Sheets

(56) References Cited

U.S. PATENT DOCUMENTS

| | | | | |
|---|---|---|---|---|
| 2004/0179154 A1* | 9/2004 | Hong | ............... | G02B 6/005 |
| | | | | 349/113 |
| 2005/0105014 A1* | 5/2005 | Hong | ............... | G02B 6/005 |
| | | | | 349/65 |
| 2006/0290684 A1* | 12/2006 | Giraldo | ............ | G02B 6/0038 |
| | | | | 345/175 |
| 2007/0152977 A1* | 7/2007 | Ng | ............... | G06F 3/03547 |
| | | | | 345/173 |
| 2009/0154198 A1* | 6/2009 | Lee | ............... | G02B 6/0081 |
| | | | | 362/624 |
| 2009/0296193 A1* | 12/2009 | Bita | ............... | G02B 6/0038 |
| | | | | 359/291 |
| 2011/0037728 A1* | 2/2011 | Gourlay | ........... | G02B 6/0043 |
| | | | | 345/174 |
| 2012/0120682 A1* | 5/2012 | Sasagawa | ......... | G02B 6/005 |
| | | | | 362/624 |

FOREIGN PATENT DOCUMENTS

| | | |
|---|---|---|
| CN | 105866997 A | 8/2016 |
| JP | 2014035980 A | 2/2014 |

* cited by examiner

DISPLAY APPARATUS

CROSS-REFERENCE TO RELATED APPLICATION

This application is a national stage application under 35 U.S.C. § 371 of International Application No. PCT/CN2017/083200, filed May 5, 2017, which claims priority of Chinese Patent Application No. 201610751496.5, filed Aug. 29, 2016, the entire contents of which are incorporated by reference herein.

TECHNICAL FIELD

The present disclosure generally relates to the display technologies and, more particularly, to a system, a display module, and a display device containing the display module.

BACKGROUND

Some conventional display panels, e.g., electronic ink display panels and reflective liquid crystal (LC) display panels, rely on light entering from their display surface to display images. To obtain good display effect in these display panels when light in the surroundings is weak, front light sources can be arranged in the display modules of these display panels.

SUMMARY

In one aspect, the present disclosure provides a display apparatus, including: a display panel having a display surface; a light-guiding plate over the display surface, the light-guiding plate including a bottom surface facing the display surface; a light source on a side surface of the light-guiding plate; and a low-refractive-index medium layer between the bottom surface and the display surface, a refractive index of the low-refractive-index medium layer being lower than a refractive index of the light-guiding plate by at least about 0.15.

Optionally, the refractive index of the low-refractive-index medium layer is less than or equal to about 1.3.

Optionally, the refractive index of the low-refractive-index medium layer is less than or equal to about 1.25.

Optionally, the light-guiding plate is made of at least one of polymethylmethacrylate (PMMA), styrene-methyl methacrylate copolymer (MS), or glass.

Optionally, the low-refractive-index medium layer includes a glue and the bottom surface of the light-guiding plate is bonded to the display surface by the glue.

Optionally, the light-guiding plate includes a plurality of scattering grid nodes.

Optionally, the scattering grid nodes are disposed on at least one of the bottom surface or a top surface of the light-guiding plate facing away from the display surface.

Optionally, a diameter of each of the scattering grid nodes is less than or equal to about 1 micron.

Optionally, the display apparatus further includes: a touch panel between the display panel and the low-refractive-index medium layer.

Optionally, the low-refractive-index medium layer includes a glue and the bottom surface of the light-guiding plate is bonded to the touch panel by the glue.

Optionally, the low-refractive-index medium layer is a first low-refractive-index medium layer; and the display apparatus further comprising a second low-refractive-index medium between the touch panel and the display panel.

Optionally, the display panel is an electronic ink display panel or a reflective liquid crystal display panel.

Optionally, the light source is a first light source and the side surface is a first side surface, and the display apparatus further includes a second light source arranged on a second side surface of the light-guiding plate that is different from the first side surface.

Another aspect of the present disclosure provides a display device, including a disclosed display apparatus.

BRIEF DESCRIPTION OF THE FIGURES

The following drawings are merely examples for illustrative purposes according to various disclosed embodiments and are not intended to limit the scope of the present disclosure.

DETAILED DESCRIPTION

Exemplary embodiments of the disclosure will now be described in more detail with reference to the drawings. It is to be noted that the following descriptions of some embodiments are presented herein for purposes of illustration and description only. It is not intended to be exhaustive or to be limiting.

Figure 1:
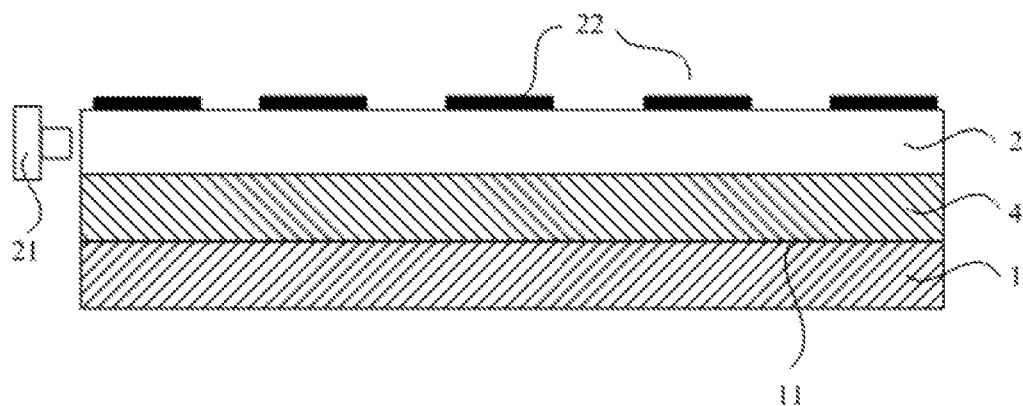
FIG. 1 illustrates a cross-sectional view of a conventional display module.

FIG. 1 illustrates a cross-sectional view of a conventional display module having a front light source. As shown in FIG. 1, the display module includes a display panel 1 having a display surface 11 and a touch panel 4 arranged over the display panel 1. The front light source includes a light-guiding plate 2 arranged over the touch panel 4 and a light source 21 arranged on one side surface of the light-guiding plate 2 to provide light to the light-guiding plate 2. A side of the light-guiding plate 2 facing the display surface 11 is bonded onto the touch panel 4. In the display module shown in FIG. 1, a portion of the light emitted by the light source 21 is incident on an edge portion of the light-guiding plate 2 that is close to the light source 21. This portion of the light undergoes multiple total reflections to reach other locations of the light-guiding plate 2. Usually, the light emitted by the light source 21 should undergo as many total reflections as possible during transmission in the light-guiding plate 2, to ensure that the brightness level at various locations in the light-guiding plate 2 is uniform. The display module shown in FIG. 1 further includes a plurality of scattering grid nodes 22 arranged over the light-guiding plate 2. The scattering grid nodes 22 cause the light travelling in the light-guiding plate 2 to exit the light-guiding plate 2 from the side close to the display panel 1.

However, the side of the light-guiding plate 2 close to the display panel 1 is in contact with the touch panel 4, and a main portion, i.e., a substrate, of the touch panel 4 has a refractive index that is close to a refractive index of the light-guiding plate 2. Typically, the refractive indices of the main portion of the touch panel 4 and the light-guiding plate 2 are both around 1.5. Accordingly, when the light travelling in the light-guiding plate 2 reaches the side of the light-guiding plate 2 close to the display surface 11, i.e., the interface between the light-guiding plate 2 and the touch panel 4, only a small portion of the light is totally reflected. A great portion of the light directly exits from this side of the light-guiding plate 2. As a result, the brightness level in the light-guiding plate 2 is non-uniform and the usage of light is low.

Figure 2:
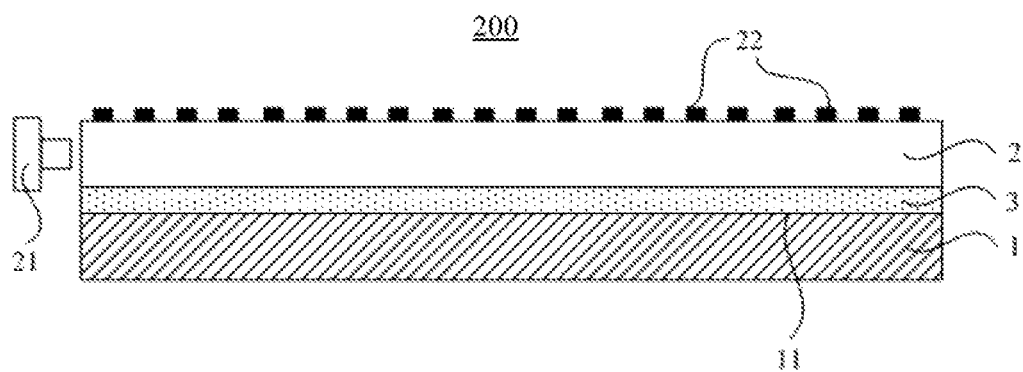
FIG. 2 illustrates a cross-sectional view of an exemplary display module according to various disclosed embodiments of the present disclosure.

FIG. 2 schematically shows an exemplary display module 200), i.e., a display apparatus 200, consistent with the present disclosure. The display module 200 includes the display panel 1 and the light-guiding plate 2 arranged over the display panel 1.

The display panel 1 includes the display surface 11. i.e., an upper surface of the display panel 1 as shown in the figure. The display panel 1 can utilize light entering from the display surface 11, such as light from the surroundings, to display images along the display surface 11, such that a user in front of the display surface 11 of the display panel 1 can see the images displayed by the display surface 11.

In some embodiments, the display panel 1 may be an electronic ink display panel or a reflective liquid-crystal (LC) display panel. The electronic ink display panel and the reflective LC display panel are common display panels that use light from surroundings to display images. In some other embodiments, the display panel 1 can be another suitable display panel.

The light-guiding plate 2 is arranged on an outer side of the display surface 11. The light-guiding plate 2 may or may not contact the display surface 11. In some embodiments, the light-guiding plate 2 can be made of a material having a refractive index of about 1.5. For example, the light-guiding plate 2 can be made of one or more of polymethylmethacrylate (PMMA), styrene-methyl methacrylate copolymer (MS), and glass. In some other embodiments, the light-guiding plate 2 can be made of another suitable material, such as a material having a refractive index of about 2.

The light-guiding plate 2 includes two main surfaces, one facing the display panel 1, also referred to as a bottom surface of the light-guiding plate 2, and the other one facing away from the display panel 1, also referred to as a top surface of the light-guiding plate 2. The two main surfaces are connected through side surfaces of the light-guiding plate 2.

The display module 200 further includes the light source 21 arranged on one side surface of the light-guiding plate 2 to provide light to the light-guiding plate 2. The light source 21 may be positioned on any suitable side surface of the light-guiding plate 2, not limited to that shown in FIG. 2. The light source 21 may be, e.g., a light-emitting diode (LED) or an LED strip having a plurality of LEDs. The light-guiding plate 2 and the light source 21 form the front light source of the display module 200, which can provide light for the display panel 1 when the light of the surroundings is weak.

As shown in FIG. 2, the display module 200 further includes a low-refractive-index medium layer 3 sandwiched between the display panel 1 and the light-guiding plate 2. The low-refractive-index medium layer 3 has a refractive index smaller than the refractive index of the light-guiding plate 2. The bottom surface of the light-guiding plate 2 can be in contact with the low-refractive-index medium layer 3. In some embodiments, the low-refractive-index medium layer 3 is a low-refractive-index glue layer made of an adhesive material and bonds the bottom surface of the light-guiding plate 2 to the display panel 1, which serves as a substrate for supporting the light-guiding plate 2. In some other embodiments, the low-refractive-index medium layer 3 can be another suitable layer, such as an air layer between the display panel 1 and the light-guiding plate 2. The specific form of the low-refractive-index medium layer is not limited by the exemplary embodiments of the disclosure.

Because the refractive index of the low-refractive-index medium layer 3 is smaller than the refractive index of the light-guiding plate 2, when light travelling in the light-guiding plate 2 is incident on the bottom surface of the light-guiding plate 2 (and thus on an interface between the light-guiding plate 2 and the low-refractive-index medium layer 3), a large portion of the incident light can be totally reflected. Thus, the light can undergo multiple total reflections and reach various positions of the light-guiding plate 2. As a result, the light-guiding plate 2 can have a more uniform brightness level, and usage of light can be improved.

In some embodiments, the refractive index of the low-refractive-index medium layer 3 may be smaller than or equal to about 1.3. In some embodiments, the refractive index of the low-refractive-index glue layer 3 may be smaller than or equal to about 1.25. A smaller refractive index in the low-refractive-index medium layer 3 makes it easier for the total reflection to occur. However, if the refractive index of the low-refractive-index medium layer 3 is too low, it may be more difficult for light to exit the light-guiding plate 2. That is, it may be more difficult to emit light from the light-guiding plate 2 for displaying images. Moreover, from the perspective of fabrication, the refractive index of the low-refractive-index medium layer 3 should be within a certain range. If the refractive index of the low-refractive-index medium layer 3 is too low, it may be difficult to form the low-refractive-index medium layer 3 and the performance of the low-refractive-index medium layer 3 may be affected. Therefore, the refractive index of the low-refractive-index medium layer 3 can be, for example, equal to or larger than about 1.1. In some embodiments, the refractive index of the low-refractive-index medium layer 3 can be equal to or larger than about 1.1 and equal to or smaller than about 1.25.

The impact of the refractive index of the low-refractive-index medium layer 3 on the total reflection may be simulated, and the result is listed in Table 1. The simulation illustrated in Table 1 only takes into account the light incident on the surface of the light-guiding plate 2 that contacts the low-refractive-index medium layer 3, i.e., the bottom surface of the light-guiding plate 2 facing the display panel 1, and does not take into account the light incident on the surface of the light-guiding plate 2 facing away from the display panel 1.

TABLE 1

Relationship between the refractive index of the low-refractive-index medium layer and the total reflection

| Maximum first incident angle | Refractive index of the light-guiding plate | Minimum second incident angle | Refractive index of the low-refractive-index medium layer | Angle of total reflection | Threshold first incident angle to allow total reflection | Percentage of light undergoes total reflection |
|---|---|---|---|---|---|---|
| 79.2° | 1.5 | 49.1° | 1.1 | 47.2° | No limit | 100% |
|  |  |  | 1.2 | 53.1° | 64.2° | 92% |
|  |  |  | 1.3 | 60.1° | 48.4° | 77% |
|  |  |  | 1.35 | 64.2° | 40.8° | 67% |
|  |  |  | 1.4 | 69.0° | 32.5° | 55% |

As used herein, the first incident angle refers to the incident angle of light emitted by the light source 21 on the side surface of the light-guiding plate 2, i.e., the angle between the direction of light transmission and the normal of the side surface of the light-guiding plate 2. Because the light source 21 usually emits light along directions within a light-exiting angle range, the first incident angle is also within a range, and the largest one in the range is the maximum first incident angle. When the light is incident on the side surface of the light-guiding plate 2, the light is refracted and is incident on the bottom surface of the light-guiding plate 2, i.e., the surface of the light-guiding plate 2 contacting the low-refractive-index medium layer 3. The degree of refraction is determined by the refractive index of the light-guiding plate 2. The second incident angle refers to the incident angle of the light on the bottom surface of the light-guiding plate 2, i.e., the angle between the direction of the light and the normal of the bottom surface of the light-guiding plate 2. The second incident angle of the light depends on the first incident angle, and a greater first incident angle can result in a smaller second incident angle. Thus, the maximum first incident angle may correspond to the minimum second incident angle.

When the refractive index of the light-guiding plate 2 is fixed, a total reflection angle, i.e., a smallest incident angle that the total reflection can occur, at the interface between the low-refractive-index medium layer 3 and the light-guiding plate 2 depends on the refractive index of the low-refractive-index medium layer 3. Further, the total reflection at the interface when the second incident angle is greater than the total reflection angle. That is, the total reflection at the interface can occur when the first incident angle is smaller than a certain angle, because the second incident angle decreases when the first incident angle increases. This certain angle is also referred to as a "threshold first incident angle to allow the total reflection" or simply a "threshold first incident angle." As listed in Table 1, the threshold first incident angle corresponding to a refractive index of 1.1 of the low-refractive-index medium layer 3 is "no limit," which indicates that the threshold first incident angle is greater than the maximum first incident angle, i.e., 79.2°. Accordingly, all the light incident on the side surface of the light-guiding plate 2 can undergo total reflection after entering the light-guiding plate 2. Further, the threshold first incident angle corresponding to a refractive index of 1.2 of the low-refractive-index medium layer 3 is 64.2°, which indicates that the light incident on the side surface of the light-guiding plate 2 with a first incident angle greater than 64.2° cannot undergo total reflection at the bottom surface of the light-guiding plate 2 after entering the light-guiding plate 2. Based on the threshold first incident angle and intensities of the light emitted by the light source 21 in various directions, the amount of light emitted by the light source 21 that can undergo total reflection can be determined. That is, the percentage of light that undergoes total reflection can be calculated.

When the absolute difference between the refractive index of the low-refractive-index medium layer 3 and the refractive index of the light-guiding plate 2 is greater than or equal to about 0.15, the percentage of light that undergoes total reflection can be high enough. Thus, using the low-refractive-index medium layer 3 can increase the percentage of light that undergoes total reflections, such that the brightness level of light-guiding plate 2 can be more uniform and the usage of light can be improved.

In some embodiments, the display panel 1 serves as the substrate for the light-guiding plate 2 and the low-refractive-index medium layer 3 includes a low-refractive-index glue layer. As shown in FIG. 2, the light-guiding plate 2 is bonded onto the display surface 11 of the display panel 1 through the low-refractive-index glue layer 3.

Figure 3:
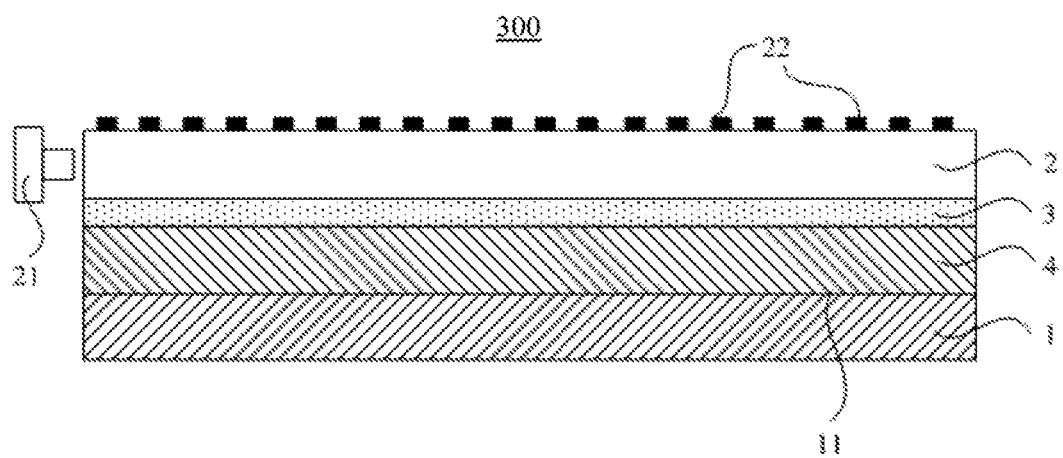
FIG. 3 illustrates a cross-sectional view of another exemplary display module according to various disclosed embodiments of the present disclosure.
Figure 4:
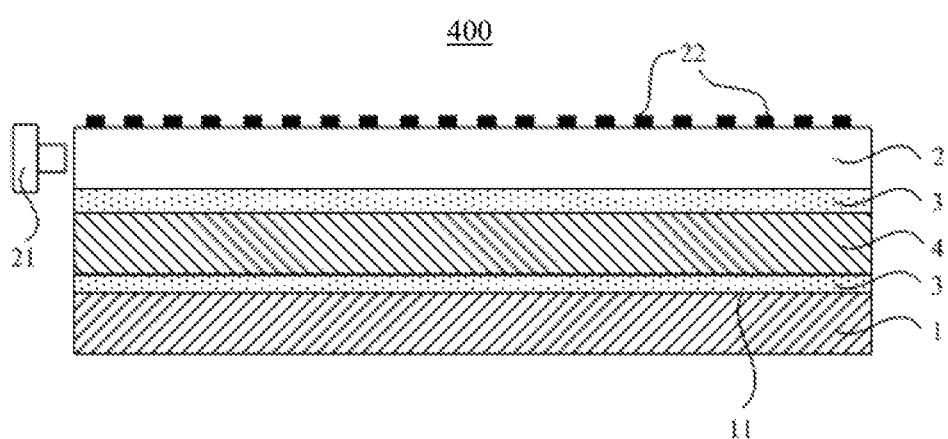
FIG. 4 illustrates a cross-sectional view of another exemplary display module according to various disclosed embodiments of the present disclosure.

In some embodiments, the display module may further include a touch panel 4 between the display panel 1 and the light-guiding plate 2, to implement touch functions, as shown in FIGS. 3 and 4. The aforementioned substrate may include a touch substrate 4.

FIG. 3 schematically shows another exemplary display module 300 consistent with the disclosure. The display module 300 is similar to the display module 200, except that the display module 300 further includes the touch panel 4 arranged between the display panel 1 and the light-guiding plate 2. Specifically, the touch panel 4 is arranged between the display panel 1 and the low-refractive-index medium layer 3. In some embodiments, the low-refractive-index medium layer 3 includes a low-refractive-index glue layer, and the light-guiding plate 2 is bonded on the touch panel 4 through the low-refractive-index glue layer 3. In these embodiments, the touch panel 4 and the display panel 1 together serve as a substrate for supporting the light-guiding plate 2.

FIG. 4 shows another exemplary display module 400 consistent with the disclosure. The display module 400 is similar to the display module 300, except that the display module 400 further includes another low-refractive-index medium layer 3 arranged between the display panel 1 and the touch panel 4. The low-refractive-index medium layer 3 between the display panel 1 and the touch panel 4 further enhances the total reflection and the light uniformity across the display module 400.

In some embodiments, the low-refractive-index medium layer 3 between the display panel 1 and the touch panel 4 includes a low-refractive-index glue layer, which bonds the side of the touch panel 4 facing away from the light-guiding plate 2 on the display surface 11 of the display panel 1. That is, the touch panel 4 can be bonded onto the display surface 11 of the display panel 1 through the low-refractive-index glue layer 3. In some embodiments, the light is already distributed uniformly in the display module 400, and thus the touch panel 4 can be fixed onto the display panel 1 through other suitable means.

Other related components or layers may also be incorporated into the display module consistent with the disclosure, such as one of the above-described exemplary display modules 200, 300, and 400, and the number of low-refractive-index medium layers 3 should not be limited by the exemplary embodiments of the present disclosure. Wherever appropriate, a low-refractive-index medium layer 3 can be inserted between certain components or layers to improve the total reflection and the transmission of light from the light-guiding plate 2 to the display panel 1. The low-refractive-index medium layer 3 can include a low-refractive-index glue layer to bond neighboring components or layers together. Further, the specific position of the touch panel 4 may be flexible to facilitate such functions.

In some embodiments, as shown in FIGS. 2-4, the light-guiding plate 2 includes a plurality of scattering grid nodes 22 that can scatter light. The scattering grid nodes 22 can change the propagation of the light in the light-guiding plate 2, such that the light can be emitted from the light-guiding plate 2 through the bottom surface of the light-guiding plate 2 to enter the display panel 1. The scattering grid nodes 22 can be disposed on the main surface close to the display surface 11, i.e., the top surface of the light-guiding plate 2, as shown in FIGS. 2-4, or on the main surface facing away from the display surface 11, i.e., the bottom surface of the light-guiding plate 2, or on both the top and bottom surfaces of the light-guiding plate 2. The diameter of a scattering grid node 22 may be less than or equal to about 1 micron. Because of the small size, the scattering grid nodes 22 can be almost invisible to the user and thus do not impact the display effect.

The specific pattern of the scattering grid nodes 22 should not be limited by the exemplary embodiments of the present disclosure. For example, the scattering grid nodes 22 may be randomly distributed or may be arranged in an array. In various embodiments, the shape of a scattering grid node 22 may also vary according to different applications or designs. For example, the shape of a scattering grid node 22 may be square or circular.

In some embodiments, the scattering grid nodes 22 may be formed by a nanoimprinting process or a photolithography process. The nanoimprinting process may include, for example, a roller nanoimprinting, an ultraviolet-curing nanoimprinting, or a micro-contact nano-printing processes. In some embodiments, the nanoimprinting process may include forming a polymer pattern through an exposure process, transferring the pattern to a hard template, and imprinting the pattern using the template, to form the scattering grid nodes 22 on the light-guiding plate 2. In some embodiments, the pattern may be transferred to the template through evaporation, stripping, reactive ion etching, and other related processes.

The photolithography process may include coating a photoresist layer over the light-guiding plate 2 or a film formed over the light-guiding plate 2, patterning the photoresist layer by exposing and developing the photoresist layer to remove portions of the photoresist layer, and removing portions of the light-guiding plate 2 or the film over the light-guiding plate 2 that are not covered by the patterned photoresist layer by etching to form the scattering grid nodes 22 on the surface of the light-guiding plate 2.

Figure 5:
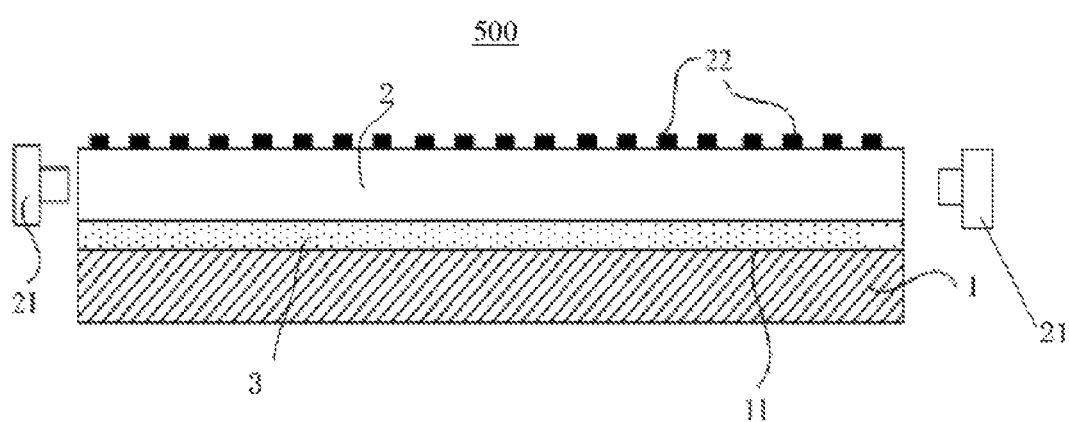
FIG. 5 illustrates a cross-sectional view of another exemplary display module according to various disclosed embodiments of the present disclosure.

In the embodiments shown in FIGS. 2-4, the display module includes one light source 21 arranged on one side surface of the light-guiding plate 2. In some embodiments, the display module can include more than one light source arranged on one side surface of the light-guiding plate 2. In some other embodiments, the display module can include a plurality of light sources arranged on a plurality of different side surfaces of the light-guiding plate, with one or more of the plurality of light sources arranged on one of the plurality of side surfaces. FIG. 5 schematically shows another exemplary display module 500 consistent with the disclosure. The display module 500 is similar to the display module 200, except that the display module 500 includes a plurality of light sources 21 arranged on a plurality of side surfaces of the light-guiding plate 2. For example, as shown in the cross-sectional view of FIG. 5, one of the light sources 21 is arranged on the left side surface of the light-guiding plate 2 and another one of the light sources 21 is arranged on the right side surface of the light-guiding plate 2.

The present disclosure also provides a display device including a display module consistent with the disclosure, such as one of the above-described exemplary display modules. The display device may be a product or a component having the display function, such as an electronic paper, a mobile phone, a tablet computer, a television, a monitor, a laptop computer, a digital photo frame, or a navigation device.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to exemplary embodiments of the disclosure does not imply a limitation on the invention, and no such limitation is to be inferred. Moreover, the claims may refer to "first", "second", etc. followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. A display apparatus, comprising:
   a display panel having a display surface;
   a touch panel on the display panel;
   a light-guiding plate on a side of the touch panel distal to the display surface of the display panel, the light-guiding plate including a bottom surface facing the display surface;
   a light source on a side surface of the light-guiding plate; and
   a low-refractive-index glue layer adhering the bottom surface of the light-guiding plate to the touch panel, a refractive index of the low-refractive-index glue layer being lower than a refractive index of the light-guiding plate by at least about 0.15 and lower than a refractive index of the touch panel adhered to the bottom surface of the light-guiding plate by at least 0.15;
   wherein the refractive index of the low-refractive-index glue layer is less than or equal to about 1.25 and equal to or larger than about 1.1; and
   refractive indexes of layers sequentially from the light-guiding plate to the touch panel undergo an increase by at least about 0.15 followed by a decrease by at least about 0.15.

2. The display apparatus according to claim 1, wherein the refractive index of the low-refractive-index glue layer is less than or equal to about 1.2.

3. The display apparatus according to claim 1, wherein the light-guiding plate comprises polymethylmethacrylate (PMMA), styrene-methyl methacrylate copolymer (MS), or glass.

4. The display apparatus according to claim 1, wherein the light-guiding plate includes a plurality of scattering grid nodes.

5. The display apparatus according to claim 4, wherein the scattering grid nodes are arranged on at least one of the bottom surface or a top surface of the light-guiding plate facing away from the display surface.

6. The display apparatus according to claim 4, wherein a diameter of each of the scattering grid nodes is less than or equal to about 1 micron.

7. The display apparatus according to claim 1,
   further comprising a second low-refractive-index medium between the touch panel and the display panel.

8. The display apparatus according to claim 1, wherein the display panel is an electronic ink display panel or a reflective liquid crystal display panel.

9. The display apparatus according to claim 1,
   further comprising a second light source arranged on a second side surface of the light-guiding plate, the second side surface being different from the first side surface.

* * * * *